UNITED STATES PATENT OFFICE.

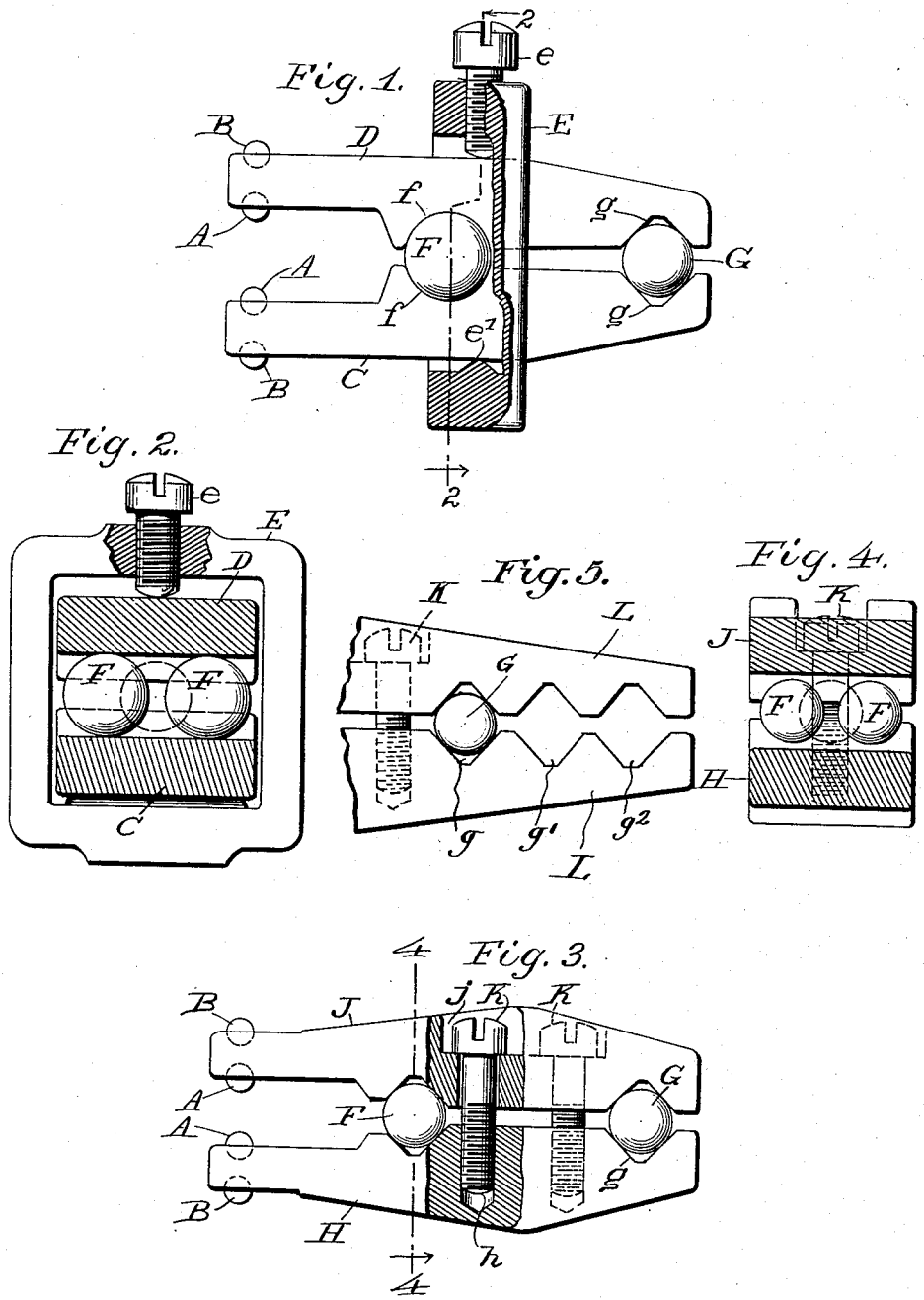

HENRY HESS, OF PHILADELPHIA, PENNSYLVANIA.

CALIPER-GAGE.

1,172,359.　　　　Specification of Letters Patent.　　Patented Feb. 22, 1916.

Application filed October 18, 1912. Serial No. 726,414.

*To all whom it may concern:*

Be it known that I, HENRY HESS, a citizen of the United States, residing at Philadelphia, in the county of Philadelphia and State of Pennsylvania, have invented certain new and useful Improvements in Caliper-Gages, of which the following is a specification, reference being had therein to the accompanying drawing.

My invention relates to caliper gages such as are used in mechanics for example for measuring interiors and exteriors.

An object of the present invention is to enable the practical and advantageous employment of preformed hardened steel spheres in caliper gages.

Another object hereof is to afford an efficient and at the same time durable and inexpensive fixed-dimension caliper gage, that is to say one in which there is no adjustment in use, but in the use of which on the contrary the work is required to be brought to a dimension corresponding with that of the gage.

Other objects and advantages hereof will appear in the description following or will be apparent to those skilled in the art.

I will first describe one or more embodiments of my invention, and will thereafter point out the novel features in the claims.

In the accompanying drawings forming a part hereof, Figure 1 is an elevation partly broken away of a form of fixed-dimension caliper gage embodying my invention. Fig. 2 is a cross-section taken on the plane 2—2 of Fig. 1. Fig. 3 is an elevation of a modified form of gage. Fig. 4 is a section taken on the plane 4—4 of Fig. 3. Fig. 5 shows a modified form for the right hand end of Fig. 3 in which adjustment of gage dimensions may be effected by shifting the single sphere.

Similar letters of reference designate corresponding parts in the several figures of the drawings.

As one part of the present invention, I propose to employ a plurality of preformed hardened steel spheres for affording the contact points of the gage. Thus the spheres A, A and B, B shown as affording the necessary contact points to enable the gage to be employed both for internal calipering and external calipering. A support C supports one of the spheres A and one of the spheres B, and a support D supports the remaining spheres.

According to one part of the present invention a fixed-dimension gage is afforded provided with the spherical contacts but in which the supports C and D are not integral but are distinct and separate members fixedly associated or connected in a predetermined relation. The supports C and D are opposed to each other so as to properly maintain the contact spheres in opposed relations, and to hold the supports C and D together any holding means may be employed such as the clamping means illustrated, consisting in a frame or yoke E having a securing device or screw e, by which pressure may be applied. The portion of the frame E opposite the screw e may have a slight projection e' so as to bear upon the support C in a manner the utility of which will be apparent.

Instead of having the two supports in direct contact I prefer to separate them by an interposed member F, or preferably a plurality of such members F, F as seen in Fig. 2, and in fact I prefer a third interposed member G, thus giving three points of separation and rendering more exact and stable the relations of the supports C and D. The supports C and D are properly shaped at f to accommodate the spheres F, and are oppositely notched at g, g to accommodate the sphere G.

It has been hereinbefore stated that preformed spheres are preferred to afford the gaging contacts or contact pieces, and the advantages thereof have already been pointed out by me, for example in my prior application Serial No. 587,703, filed Oct. 18, 1910. In the present case and on account of the same advantages, I prefer that the interposed members F, F, G shall also consist of preformed spheres.

We thus have in Figs. 1 and 2 a complete caliper gage in which the two interposed members or spheres F, F are supposed to be of identical size and the member or sphere G of such size as to bring the contact spheres A, A, B, B into proper relation. The clamping device E is seen to be located between the spheres F, F, G, thus rendering permanent the complete caliper gage. In one sense the two spheres F, F coöperate to act as a cylindrical pin or pivot.

An interchange for the sphere G of another sphere of larger or smaller size would constitute of the instrument a new gage having a different dimension. Therein lies an advantage of the described gage, for not only does the interchange of spheres at G permit standardization, but a series of spheres of graded sizes might be employed to be inserted as desired while the clamp E is loosened, thus throwing the contacts A, A, B, B apart or together by predetermined distances, and thus rendering a single gage available for a number of sizes. At the same time it is a fixed-dimension gage, for there is no adjustment in use. Interchange could also be made of the spheres F, F. The entire matter of interchange is capable of being easily systemmatized.

Referring now to the modification of Figs. 3 and 4, that differs from the first form in several respects, we have the contact spheres A, A, B, B as before. The supports H, J therefor, however, are held or clamped together in opposed relation not through a yoke or frame, but merely by means of one or preferably two bolts K, K, each entered in one of the supports, for example J, at a recessed or countersunk portion $j$ thereof, and passing more or less loosely through such support into screw-threaded engagement with threaded bore $h$ in the other support. The looseness of the bolt permits sufficient play for interchange of the interposed members or separators F, F, G, when the bolts are loosened.

A further modification may be provided as indicated in Fig. 5 wherein the ends of the two supports J, H opposite to the contact spheres A, B are prolonged, as indicated at L, L, and at least one and preferably both of them provided with a series of notches $g'$, $g^2$, etc., whereby the interposed sphere G may be shifted from notch $g$ to notch $g'$ or to notch $g^2$, etc., thus affording a means of resetting the gage when the clamping screws K, K are loosened to alter the gage's dimension as determined by the relative positions of contacts A, A, B, B.

Specifically while I have shown and referred to a pair of opposed contact supports, this does not negative that there might be a greater number, and it will be therefore understood that by a pair I mean at least a pair.

It will be seen that by the foregoing described embodiments, I have attained the objects and advantages hereinbefore recited and referred to.

Since many features hereof may be employed without other features and may be variously modified in detail and form, I do not wish to be limited to matters of detail or form excepting as set forth in the appended claims.

What I claim and desire to secure by Letters Patent is:

1. A caliper gage comprising in combination a pair of opposed supports provided with gaging point contacts, three separate spheres located between said supports, and means for holding or clamping the whole together; said spheres being arranged in a triangle with its base transverse to the length of the gage and the single sphere at the apex being readily detachable whereby alterations of the gage dimension may be effected by change of the single sphere at the apex.

2. A caliper gage comprising in combination a pair of opposed supports provided with gaging point contacts, a plurality of interposed spherical pieces located between said supports, namely, two arranged in a given line transverse to the gage length and a single sphere at another point in the gage length, and means for holding or clamping the whole together, said single sphere being readily detachable whereby it may be interchanged for another sphere of different size for altering the gage size.

3. A caliper gage comprising in combination, opposed supports, contact spheres provided on the gaging portions of said supports, a plurality of interposed pieces located between and holding said supports spaced apart at one point in the gage length, and an interposed piece at another point, the latter being readily detachable whereby it may be interchanged for another sphere of different size for altering the gage size, and means for detachably clamping the whole together with said contact spheres in predetermined gaging relation.

4. A caliper gage comprising in combination, opposed supports, contact spheres provided on the gaging portions of said supports, a pivot means separating the supports at a point removed from the gaging contacts, and an interposed separator at another point, the latter being readily detachable whereby it may be interchanged for another sphere of different size and means for detachably clamping the whole together with said contact spheres in predetermined gaging relation.

5. A caliper gage comprising in combination, a pair of opposed supports provided with gaging contacts and shaped to receive a round separating pivot means between them, a round separating pivot piece interposed between said supports, said supports extending substantially beyond said round pivot means, and having a series of notches for receiving a round piece, a round piece engaged in one of said notches selectively, and means for clamping the whole together.

In testimony whereof I affix my signature in presence of two witnesses.

HENRY HESS.

Witnesses:
CHARLES S. BUTLER,
OLGA A. HOLLAND.

Copies of this patent may be obtained for five cents each, by addressing the "Commissioner of Patents, Washington, D. C."